United States Patent [19]

Warman

[11] Patent Number: 4,467,143

[45] Date of Patent: Aug. 21, 1984

[54] TELEPHONE CONFERENCE AMPLIFIERS, AND TELEPHONE CONFERENCE BRIDGES INCORPORATING THE SAME

[76] Inventor: Bloomfield J. Warman, 67, King Harold's Way, Bexleyheath, Kent, England

[21] Appl. No.: 426,596

[22] Filed: Sep. 29, 1982

[30] Foreign Application Priority Data

Oct. 22, 1981 [GB] United Kingdom ............... 8131927

[51] Int. Cl.³ ............................................. H04M 3/56
[52] U.S. Cl. .............................................. 179/18 BC
[58] Field of Search .......... 179/18 BC, 170 R, 100 L, 179/81 B; 381/110, 107, 108, 56, 57, 120, 121

[56] References Cited

U.S. PATENT DOCUMENTS

| | | | |
|---|---|---|---|
| 3,872,262 | 3/1975 | Kerman ......................... | 179/18 BC |
| 3,991,280 | 11/1976 | James et al. ..................... | 179/18 BC |
| 4,049,920 | 9/1977 | Knollman ....................... | 179/18 BC |
| 4,139,731 | 2/1979 | Hashemi et al. ................ | 179/18 BC |

Primary Examiner—G. Z. Rubinson
Assistant Examiner—W. J. Brady
Attorney, Agent, or Firm—Sughrue, Mion, Zinn, Macpeak and Seas

[57] ABSTRACT

In a telephone conference bridge, a conference port amplifier comprises amplifying means for providing signal amplification in both directions, the direction of amplification of the amplifier being switchable such that amplification can be provided selectively in one or other direction of speech transmission, while signals applied in the reverse direction are attenuated. The amplifier is biased in such a manner that, in the absence of any speech signal, the direction of amplification provided by the amplifier is from the conference bridge towards a connected telephone line, and means for detecting the presence of a speech signal applied to the amplifier for transmission from the connected telephone line to the conference bridge is arranged to cause switching of the amplifier to reverse its direction of signal amplification. By this means, the signal to noise ratio experienced by each conferee connected to the conference bridge is reduced when the silent conference bus is in the quiescent condition. Preferably, the means providing attenuation of speech signals in a direction towards the conference bridge comprises a gating means for disconnecting the output of a corresponding amplification channel of the amplifier from a common conference bus. Thus, the directionally switched nature of the amplifier is exploited so as to avoid the interconnection loss which is normally inherent in a conference bridge.

3 Claims, 7 Drawing Figures

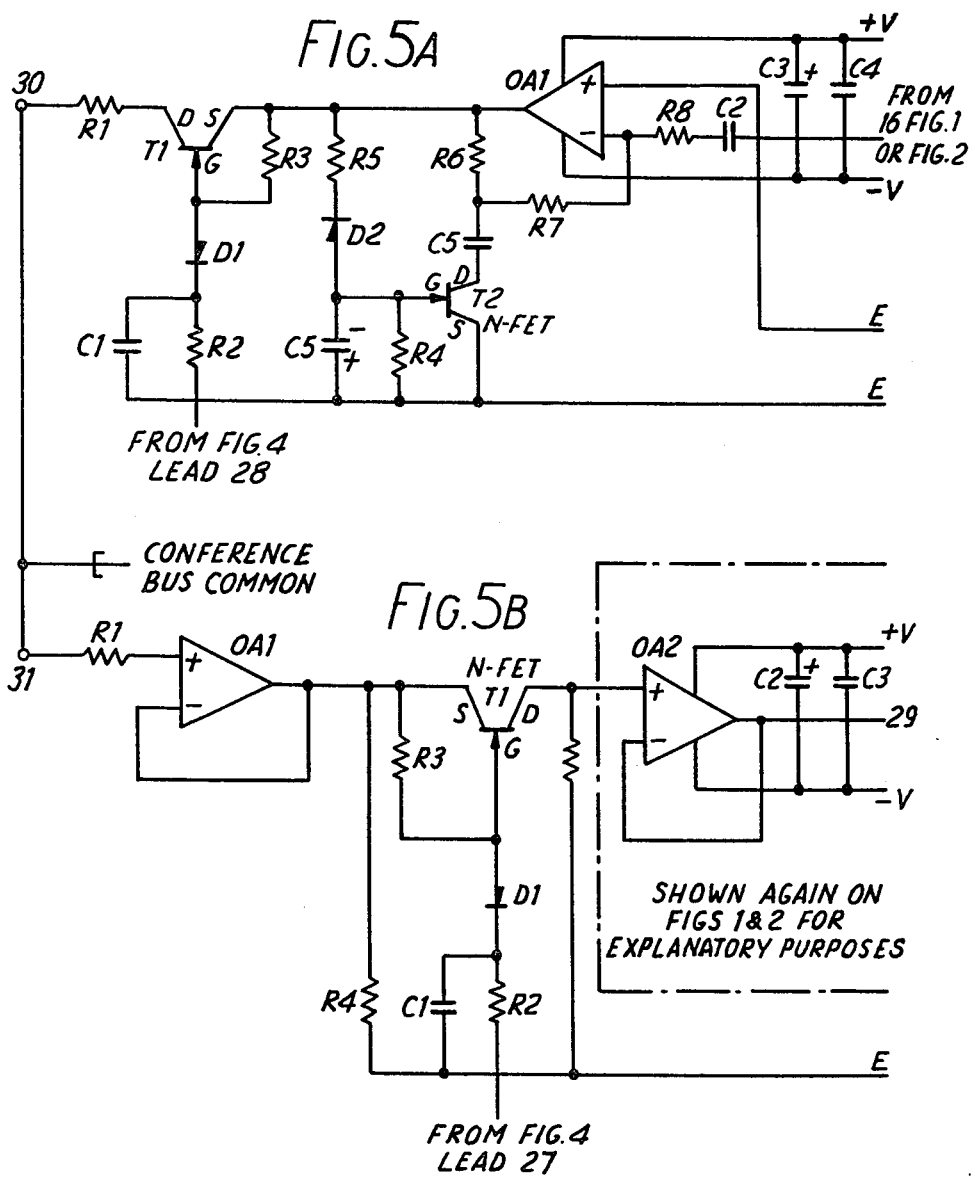

TELEPHONE CONFERENCE AMPLIFIERS, AND TELEPHONE CONFERENCE BRIDGES INCORPORATING THE SAME

CROSS-REFERENCE TO RELATED APPLICATION

This application is related to subject-matter described in application Ser. No. 259,273 now U.S. Pat. No. 4,435,621 filed on Apr. 30, 1981 by me.

BACKGROUND OF THE INVENTION

This invention concerns improvements in telephone conference amplifiers.

In known arrangements for providing a switched connection between a plurality of telephone extensions, whether via a private exchange or the public telephone network, it is necessary for the connection to be established via a so-called conference bridge. Since the speech signal originating from any one party to the conference call becomes attenuated as a result of the connection of the telephone line to the conference bridge and the consequent loading of the line by the plurality of parallel-connected lines of the other parties to the conference, known conference bridges incorporate at each port to the bridge at which a connected telephone line is terminated, a so-called conference port amplifier, the purpose of which is to provide compensation for attenuation of a signal applied to the bridge, either due to the loading presented by the conference bridge itself, or due to the attenuation arising in the telephone line itself. Since such a conference port amplifier generally provides amplification for signals transmitted in both directions via the telephone line, it is necessary for stable operation of the amplifier to ensure that the loop gain of the amplifier is kept below unity. One approach to this problem is to utilise so-called directional amplifiers, wherein at any given time amplification is provided in only one direction of signal transmission, while signals in the return direction are attenuated. In hitherto known types of directional switching amplifier, the action of this is usually arranged in the form of an electronic see-saw balanced to a mid-point when there is neither incoming nor outgoing speech. Switching of the amplifier to one or other direction is achieved in response to detection of the direction of the predominating signal applied to the amplifier, so that the amplifier is switched to transmit in the direction of the signal of greater amplitude. Such an arrangement has a number of disadvantages, and in particular, it prevents the amplifier from being switched to transmit an outgoing signal from the conference bridge to a telephone line connected at an individual port, in the face of a relatively greater signal transmitted from the telephone line towards the conference bridge.

SUMMARY OF THE INVENTION

The present invention provides a telephone conference port amplifier comprising amplifying means for providing signal amplification in both directions, the arrangement being such that the amplifier is biased, in the absence of any speech signal, in a direction such as to provide amplification of signals in a direction from the conference bridge towards a connected telephone line, whilst attenuating signals in the reverse direction, means being provided for detecting the presence of a speech signal applied to the amplifier for transmission from the connected telephone line towards the conference bridge, and the amplifier further being arranged, in the presence of such a detected signal, to reverse the directions of signal amplification and attenuation respectively.

An arrangement in accordance with the invention has the advantage that, when a plurality of such conference port amplifiers are connected together in a conference bridge configuration, all the conference port amplifiers are normally set to send from the conference bus to the lines and thus to the conferees. Each conferee is only listening to the noise of his own line and the silent conference bus in the quiescent condition, when nobody is speaking. When one of the conferees speaks then his conference port amplifier reverses its direction of switching so that the "Send" channel is shut down and the "receive" channel actuated to feed the transmission from the line to the conference bus so that he will be heard by all the other conferees via the "send" amplifiers of their conference ports already connected from there. Now all conferees will receive the speech and background noise from only one line, that which is speaking, in addition to their own. This is the normal signal to noise condition of the type of two party telephone conversation to which all the conference parties will be accustomed and for which the working of the telephone network and its transmission plan was optimised.

Speech Level Compensation

Preferably, the "receive" channel of the amplifier feeding towards the conference bus is made to be of the output limiting type so as to restrain the speech signals fed to the conference bus to a prescribed maximum level irrespective of the level of speech signal being received from the line. Conferees listening to the signals from the conference bus will thus receive the transmissions from all other conferees at the same maximum level, irrespective of the length of the speaking conferee's line and the level at which he is speaking. The prescribed level of signal on the conference bus is preferably chosen to be that which will cause the standard reference level of 1 milli-watt into 600 ohms to be sent to line so that all conferees will receive the compensated transmissions from the conference bus at the maximum signal level that the administration allows.

To provide this level compensation on the conference bus the "receive" amplifier must have a maximum gain much more than that required to compensate only for the maximum permitted line loss of 18 db. To this must be added a further margin to compensate for quiet speakers and those with voices of less "attack", such as the ladies whose voices usually adopt a softer modulation, with less base resonances.

The maximum gain of the "receive" amplifier should thus more nearly approach 28 to 30 db. if full compensation is to be provided in all circumstances.

This voltage gain is in excess of the power gain necessary to overcome the losses normally inherent in the interconnection of the conference ports at the conference bus.

In accordance with a further preferred feature of the invention, therefore, the conference port amplifier is so constructed that the means for providing attenuation of signals in a direction from a connected telephone line towards the conference bridge, that is to say in the "receive" direction, comprises gating means provided at the output of the receive channel of the conference port amplifier. Thus, the directionally switched nature of the amplifier is exploited so as to avoid the interconnection loss, which is normally inherent in the conference bridge and is assumed to be the principal reason for the provision of a conference port amplifier at all.

The "receive channel" gate, activating the "receive channel" to pass the conferee's speech towards the conference bus when he speaks, is placed adjacent to the conference bus at the output of the "receive" amplifier so that its relatively low output impedance is not connected to load the conference bus so as to contribute to the attenuation there, unless the conferee speaks. This gate is therefore not only connecting the conferee's speech but also the output impedance of the conference port amplifier, when the conferee speaks.

The input impedance of the "send" amplifers of all the conference ports which are normally connected to the conference bus are relatively high and indeed can be made as high as is thought necessary by the application of suitable electronic design expediencies which are well known. The interconnection loading of a conference bus arises not from the presence of the high input impedances of the "send" amplifiers feeding the signals on the conference bus for their respective conferees to hear, but due to the relatively low output impedances of all the "receive" amplifiers connected to this same place and heavily loading the bus.

Because of the presence of these drive amplifiers with their outputs connected in common on the conference bus, the attenuation normally assumed for such an interconnection is (1/n) where "n" is the number of conference port amplifiers thus interconnected to form the conference bridge.

It will be seen that the actual output impedance of the "receive" amplifier driving onto the conference bus, does not enter into this relationship. The lower or higher this impedance is made, so the lower or higher will become the loading each of the n−1 conference port amplifiers will apply to the conference bus, against the efforts of the one that is operational to drive a speech signal.

However, in the circumstances being described here, where a "receive" amplifier is only connected to impose its output impedance to load the conference bus when it is actually talking onto the bus, then it is only required to drive into the very high input impedances of the "send" amplifiers, unless another conference port is talking.

The "receive" amplifier can thus be buffered to exhibit a relatively high output impedance to the conference bus without the loss of signal on the bus in the ratio of (1/n) that would more normally be expected and the number of conference ports that can be associated together to form a conference bridge, is virtually unrestricted. More importantly the number can be changed to suit the size of the conference without changing the attenuation of the common conference interconnection which, assuming the "send" amplifiers to have infinite input impedance, will remain at zero voltage loss irrespective of the number of conferees, up to any reasonable maximum. For example, the inventor can see no reason why several hundred or even thousands of such conference ports could not be associated to comprise a single conference bridge, especially if suitable design methods increasing the input impedance of the "send" amplifiers above their already naturally high values, is restored to.

When more than one subscriber speaks simultaneously, then each "receive" amplifier will load the other, the relationship of attenuation of (1/n) being reestablished as applicable for the number of conferees who are speaking simultaneously.

This means that the speech signals from each of the conferees to the conference bus will be attenuated in this proportion but the maximum voltage swings which might appear on the conference bus will be unaffected, as the sum of the signals from the multiple sources.

Far from being a disadvantage, this can be regarded as an important feature of this conference port amplifiers design, without which the maximum signal levels permitted to be sent to line by the telephone administration might have been exceeded. As has already been said, the "send" amplifier is adjusted so that the signal sent to line from the prescribed maximum level on the conference bus which the output limiting amplifiers of the "receive" channels are maintaining, is arranged to be that maximum that the administration will allow so as to feed the best possible signal to all the conferees. If more than one conferee is talking simultaneously onto the conference bus (let us imagine the conferees all raising a cheer), then unless some voltage clipping action is induced onto the bus, the maximum output signal to line is likely to be exceeded or extreme distortion of the signal be induced. Instead the action is that the signals on the conference bus from all simultaneously speaking conferees, is reduced in the proportion of the number doing so, in accordance with the relation (1/n) so that distortion is avoided, whilst the signals sent to line are restrained within the limits laid down by the telephone administration.

The arrangement in accordance with the invention may effectively utilise a direction detection device of the kind described in my copending U.S. patent application No. 259,273 now U.S. Pat. No. 4,435,621 in order to effect the required directional switching of the conference port amplifier.

DETAILED DESCRIPTION OF THE INVENTION

Figure 1:
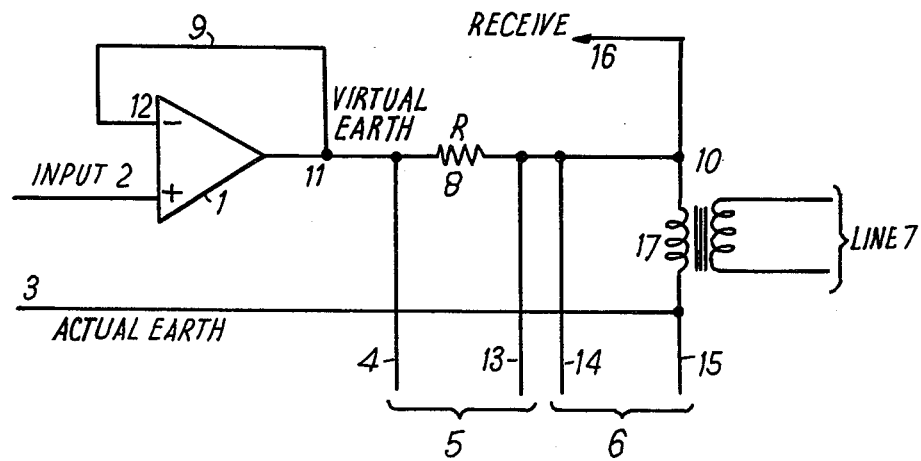
FIGS. 1 to 3B are respectively circuit diagrams of relevant parts of a direction detector device as already described in the above-mentioned U.S. patent application No. 259,273 now U.S. Pat. No. 4,435,621.

Referring to the drawings, FIGS. 1, 2, 3A and 3B comprise the direction detector as described in copending U.S. patent application No. 259,273 now U.S. Pat. No. 4,435,621. It is not considered necessary to describe the operation of this part of the slave responder circuit, which is thus already known, treating it as an established arrangement whose actions are exploited here.

Figure 3A:
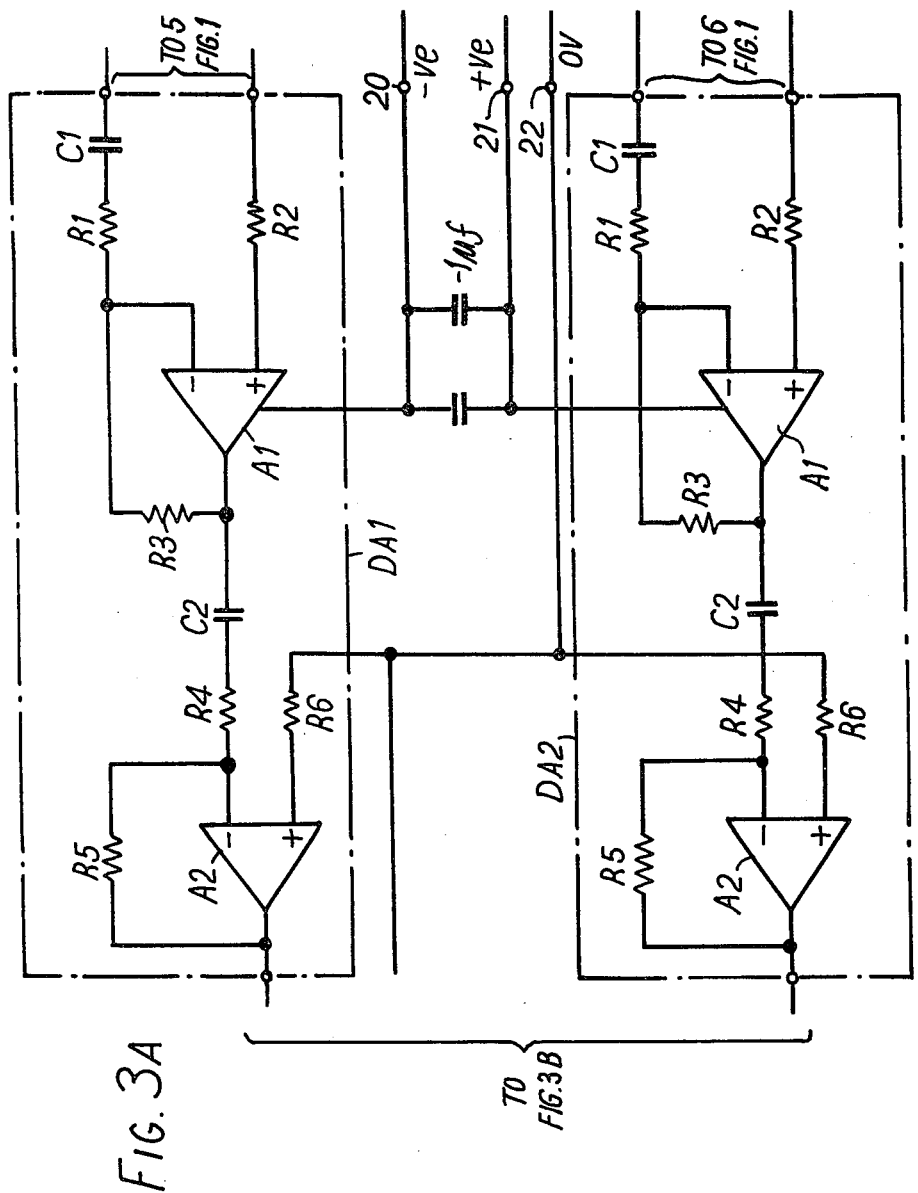
Figure 3B:
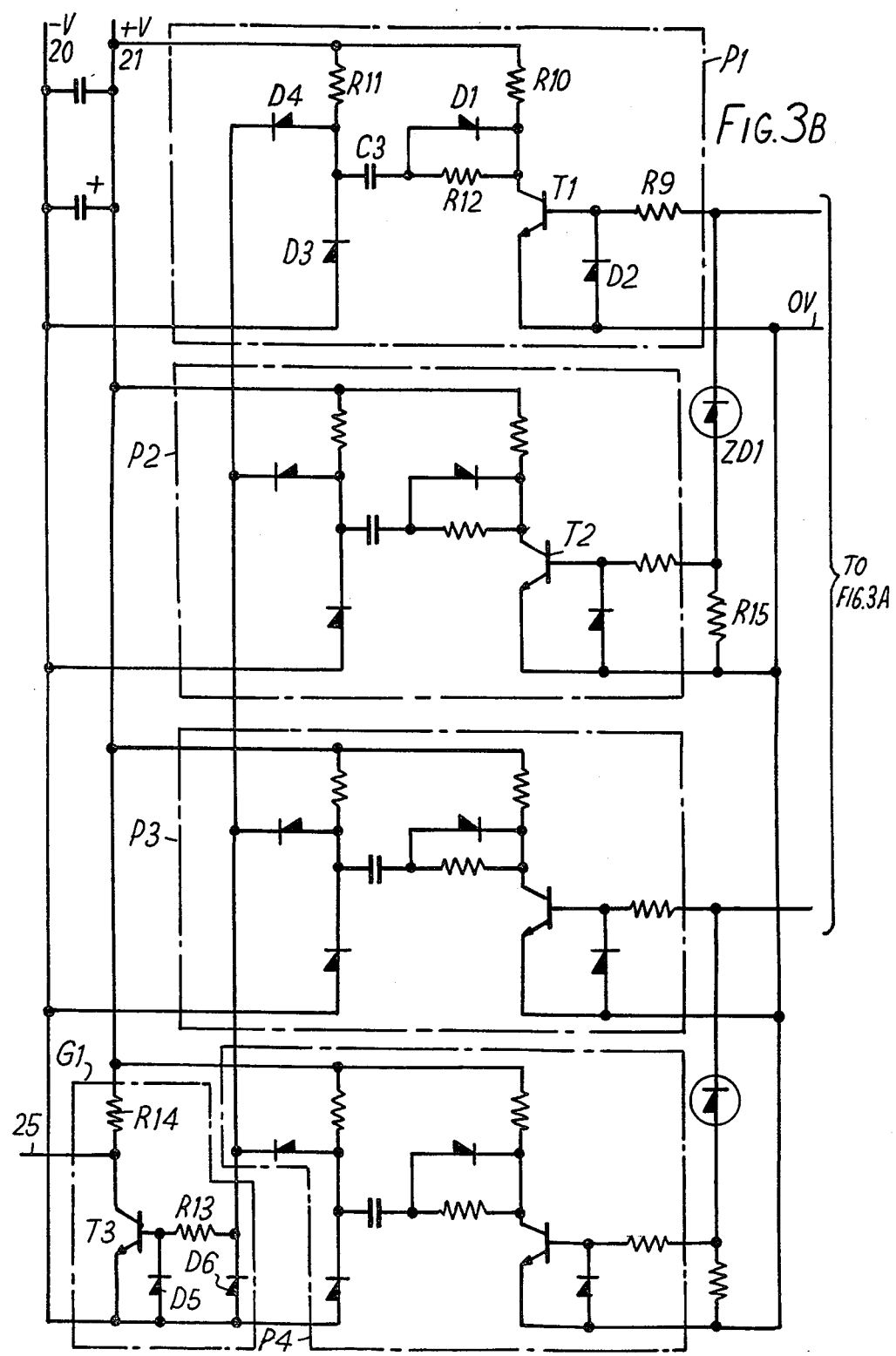
Figure 4:
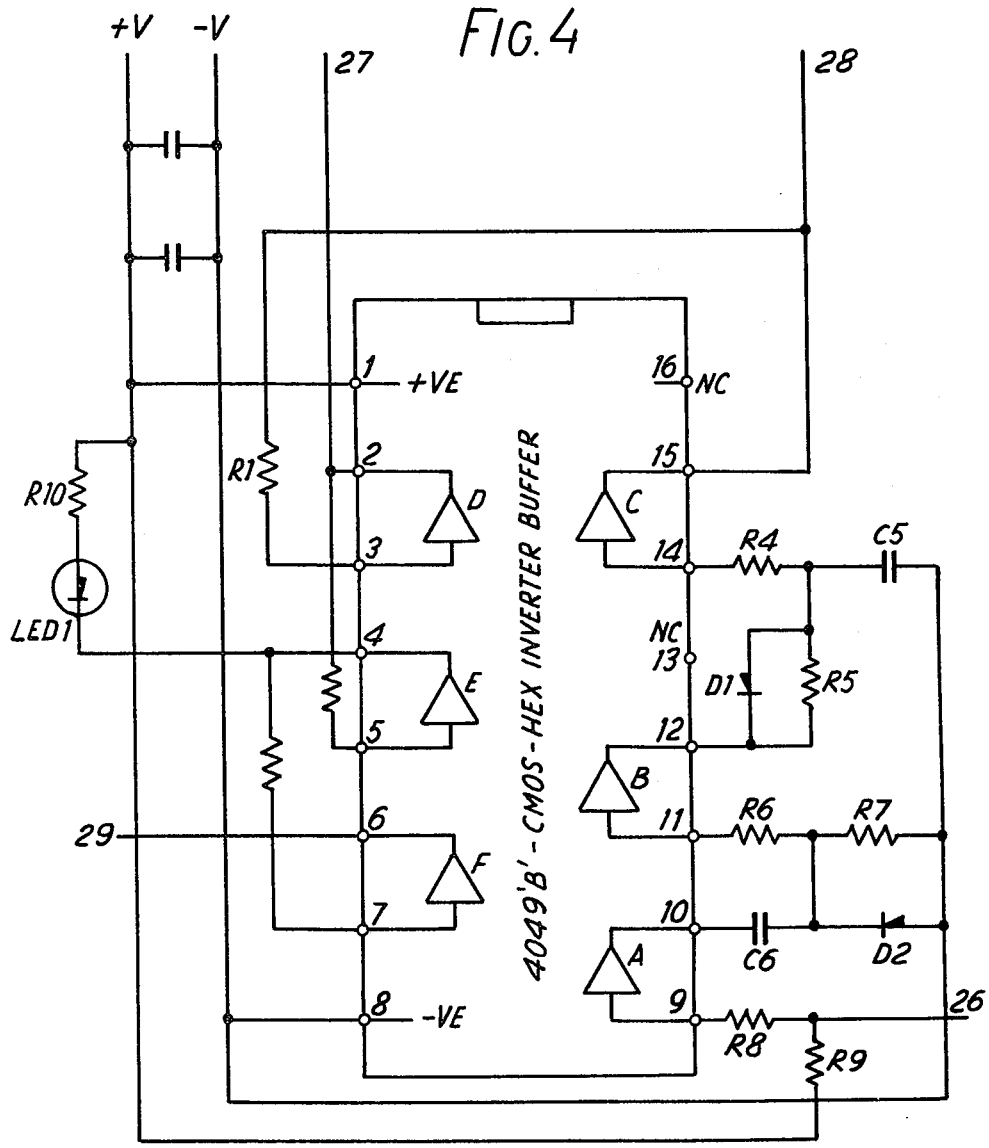
FIG. 4 is a circuit diagram of a circuit for deriving switching signals from the output of the device shown in FIGS. 1 to 3B, and FIGS. 5A and 5B are respectively circuit diagrams illustrating the interconnection of the device of FIGS. 1 to 3B with the receive and send channels of a conference port amplifier in accordance with the invention for providing connection to a common conference bus.

Suffice it to say that when speech signals are received from the line via the line transformer then trains of positive going pulses will appear at the output point 25 of FIG. 3B which pass to the input point 26 of FIG. 4 the operation of which has not been described until now.

FIG. 4 employs a 4049B Hex inverter buffer C.MOS chip to provide an integrating function on the presence of these pulses to convert them to provide D.C. excursions at output points 27 and 28 which control the directional switching of the slave responder circuits "receive" and "send" channels.

FIG. 5A comprises the "receive" channel providing an "output limiting" amplifier OA1, with channel gating performed under control of FIG. 4, lead 28 by T1-N.FET transistor and the speech compression function limiting the output of T2-N.FET transistor adjusting the feedback of the OA1 operational amplifier.

Figure 2:
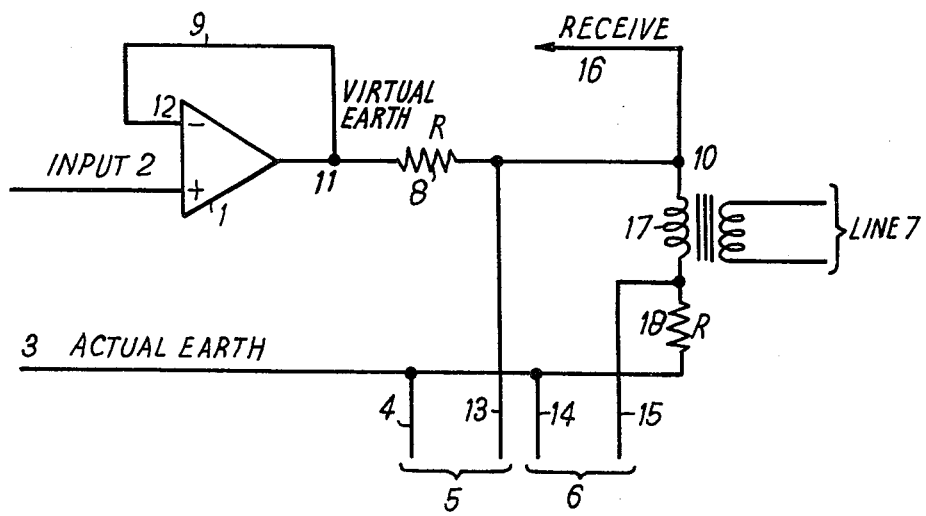

FIG. 5B comprises the "send" channel, providing a line driving function to the line via the transformer of FIG. 1 or FIG. 2 by OA2 connected as a voltage follower with 100% negative feedback so as to give a very low output impedance able to serve as the "virtual earth" necessary for the correct operation of both FIG. 1 or FIG. 2, as has been described for these circuits in copending U.S. patent application No. 259,273 now U.S. Pat. No. 4,435,621, where the operational amplifier 12 shown on these Figures is a reiteration of the OA2 operational amplifier of FIG. 5B. A gating function is provided by T1-N.FET transistor under control of lead 27 from FIG. 4. OA1 operational amplifier is also connected as a voltage follower with 100% negative feedback and serves as an input buffer.

When a speech signal is received incoming from the line then the action of the circuits of FIG. 1 or 2 and FIGS. 3A and 3B is to signal this by passing a stream of positive going pulses at the same base frequency as the received signal to the output terminal 25 of FIG. 3B. All this is described in copending U.S. patent application No. 259,273 now U.S. Pat. No. 4,435,621. The positive going pulses are passed to the input of FIG. 4 at lead 26, which is connected from lead 25 of FIG. 3B and these pulse excursions are now followed by buffer amplifier 'A' of the 4049B Hex inverter buffer chip of FIG. 4.

Thus, the output of the 'A' buffer which is normally positive will excurse negatively on each of these incoming pulses to cause C6 capacitor to change via D2 diode from the negative supply rail with R7 providing its relatively long time constant discharge path. Thus the input of the "B" buffer of the 4049B chip which is normally at negative potential, will excurse to a positive potential, through the charge on C6, excursing negatively with each of the short duration pulses from the 'A' buffer, as these refurbish the charge upon the C6 capacitor.

The output of the "B" buffer which is normally at positive potential will now have excursed to a negative potential so as to charge the C5 capacitor via D1 diode to this negative excursion with R5 providing a relatively long time constant of discharge for C5 capacitor which can be thought of as connected in the reservoir capacity mode so as to hold the negative excursion at the output of the "B" buffer which has charged C5 capacitor against the short duration positive excursions as it sympathetically follows the short duration input pulses at 26 but from the new datum established by the charge on the C5 capacitor.

Thus, the input of the "C" buffer of the 4049B chip will be subjected to an essentially negative potential from the C5 capacitor "sagging" slightly in accordance with the time constant of C5 and R5 during the short duration pulses "on period."

Thus, when pulses are received at the input lead 26 then the output of the "C" buffer, which is normally held at negative potential, will excurse positively whilst pulses are received and be held in this condition for the discharge period of the C5-R5 combination after the pulses cease. Thus the output potential at the lead 28 will excurse from negative to positive potential, virtually across the range of the positive and negative supply rails of the "slave speech responder element".

The output of the "C" buffer is also fed via the relatively low resistance R1 to the input of the "D" buffer of the 4049B chip so that this will excurse from negative to positive and the output of this "D" buffer which is positive will excurse from the normal positive it is feeding to the output lead 27 to become a negative potential in anti-phase to the excursion on lead 28 already mentioned.

The output of the "D" buffer is also fed to the input of the "E" buffer whose output is fed to the input of the "F" buffer so that in cascade these two buffers generate a further sympathetic anti-phase excursion at their outputs.

The output of the "E" buffer serves to drive the LED 1 light emitting diode, which is normally lit from the output of the "E" buffer to the positive supply rail via the R10 resistor, so that this extinguishes to give visual indication for test purposes when the input pulses to lead 26 indicates that speech is being received, whilst the output 29 is available as a negative going excursion for any other supervisory purposes that might be required.

The R1 to R4 and R6 and R8 resistors are of relatively low resistance and provided in accordance with standard practice with such C.MOS chips to help protect the high impedance inputs of the buffers "A" to "F". The R9 resistor is in shunt with the collector load R14 of FIG. 3B when the connection between lead 26 of FIG. 4 and lead 25 of FIG. 3B is provided and protects the input of the "A" buffer from being open circuit before this connection is made, during manufacture.

The anti-phase excursions thus generated on the leads 27 and 28 are connected away to FIGS. 5B and 5A respectively where they serve to control the gating of these "send" and "receive" channels, which action constitutes the directional switching function provided by the conference port amplifier.

FIGS. 5A and 5B comprise the "receive" and "send" channels of transmission respectively of the conference port amplifier which channels are rendered open when a positive potential is applied to their gates, comprising the T1 transistor R2 and R3 resistors the D1 diode and C1 capacitor in each case, at the R2 resistor so that the D1 diode is cut off, disconnecting the T1 transistors gate lead, except for the R3 connection of this to the source so that it can discharge.

This removal of the voltage from its gate lead allows the T1 transistor to conduct and pass speech signals through itself from the source to drain terminals.

When a negative voltage is applied to the R2 resistors either by lead 27 or lead 28 of FIG. 4 then this voltage passes through the D1 diode so as to bias off the T1 transistor at its gate which then becomes closed since there will be no conducting path between the source and the drain.

The C1 capacitors are to decouple the gates and slow the rise times so as to reduce any switching noise which might otherwise pass into the speaking circuits during the process of setting the gates.

The gate of FIG. 5A is served by lead 28 from FIG. 4 which is normally negative and so the associated "receive channel" is normally closed whilst the gate of FIG. 5B is served by lead 27 from FIG. 4 which is normally positive and so the "send" channel is normally open. This condition is reversed when there is an incoming speech signal to cause the actuation of the circuit of FIG. 4 as has just been described.

The "send" channel shown in FIG. 5B has the two operational amplifiers housed together in a 747 chip and designated at OA1 and OA2 connected with 100% negative feedback to be zero gain voltage followers. OA1 provides a buffer amplifier function preventing the possibility of any feedback to the input arising from the gating actions just described whilst OA2 provides a very low impedance voltage follower driving source out to the transformer network of FIG. 1 or FIG. 2. and so to line. The very low output impedance at its output 31 constitutes the virtual earth necessary for the correct working at the input to FIG. 3A serving the direction detector elements of FIGS. 3A and 3B, described in copending patent application No. 259,273 now U.S. Pat. No. 4,435,621 covering its circuit action. The OA2 operational amplifier has also been shown in FIG. 1 and FIG. 2 to assist in the separate explanation of the working of this direction detector function.

Thus, in the quiescent state the OA2 operational amplifier is providing a very low impedance output to FIG. 1 or 2, whichever is employed, and at zero volts, in relation to earth, so as to be electrically indistinguishable from it and to justify its being described as a virtual earth.

The T1 transistor gate is normally open so that any signals appearing at the input 31 will pass through the gate function to the input of the OA2 operational amplifier connected as a voltage follower and so out to line from the virtual earth connection at the output 29, at which time this "virtual earth" is not so "earthy" any more, since it is driving a voltage but still retains its low output impedance.

FIG. 5A shows the "receive channel" amplifier with its gating and OA1 operational amplifier connected as an "output limiting" amplifier whose gain is self-regulating to provide lower gain on high signal inputs than on low signal inputs by the action of T2-'N' channel field effect transistor providing a variable shunt on the feedback path of R6 and R7 resistors via C5 non-polarised capacitor.

The C5 capacitor charges from the D1 diode rectifying the signal output from the OA1 operational amplifier via the R5 resistor and with the shunt resistor R4 has a discharge time constant of approximately 1 second of its accured voltage which is used to negatively bias the gate terminal of the T1-N.FET transistor.

Thus, the larger the signal at the output of OA1 then the larger the negative voltage on the C5 capacitor and presented to bias off the T1-N.FET thus reducing the shunt it presents to the negative feedback path of R6 and R7 at their junction, thus reducing the gain of the OA1 amplifier circuit for larger signals.

By suitable tailoring of the component values the output to lead 30 of FIG. 5A can be constrained to a prescribed value over a large variation of the input signal voltage. Notably changes of the value of R8 can adjust the range of input sensitivity once the output limiting value has been set by the values applied to biasing the N.FET transistor in respect of its type and characteristics.

The R1 resistor has been provided to give some protection against overload to the output of OA1 operational amplifier feeding via the T1-N.FET transistor gate. This is especially important since the output point 30 is to be connected to join with other similar conference port amplifiers which will tend to load each other on the common conference bus thus formed, and if more than one subscriber is speaking at a time so that more than one T1-N.FET transistor gate is open, the OA1 operational amplifiers will be tending to drive into each other rather than into only the high input impedances at the voltage follower inputs of OA1 of the "send" channel of FIG. 5B at input lead 31.

The input lead to the OA1 operational amplifier of FIG. 5A "receive" amplifier, at C2 capacitor is connected as indicated on the diagram to the "receive" lead from the line transformers of either FIG. 1 or FIG. 2, whichever arrangement is adopted, which lead is designated 16 there, providing a feed of any transmissions from the line to the "receive channel".

I claim:

1. A telephone conference port amplifier comprising send and receive speech path channels respectively connected between a common port intended for connection in common with like ports of other conference port amplifiers to a conference bus and a conference port providing coupling to a telephone line, said send channel serving for the transmission of speech signals in a direction from said common port towards the conference port and said receive channel serving for the transmission of signals in a direction from the conference port towards the common port, wherein each said speech path channel includes an amplifying means and an associated, controllable attenuating means, and said amplifier further comprises control means, having an input connected to said conference port, having outputs connected to said respective controllable attenuating means, and arranged in response to the detection at said input of a speech signal received from the telephone line to control said attenuating means in senses such that attentuation is introduced into the send channel and removed from the receive channel, and in the absence of such a detected signal to control said attenuating means in senses such that attenuation is introduced into the receive channel and removed from the send channel.

2. A telephone conference port amplifier as claimed in claim 1, wherein the said controllable attenuating means contained in said receive channel comprises an on/off switch connected between the output of the associated amplifying means and the said common port, whereby, in the absence of an incoming signal received at said conference port, the output impedance of the receive speech path amplifying means is disconnected from said common port.

3. A telephone conference bridge comprising a single conference bus, and a plurality of amplifiers as claimed in claim 2 and having their common ports directly connected in common to said single conference bus.

* * * * *